United States Patent Office 3,382,227
Patented May 7, 1968

3,382,227
BLOOD PROTEIN FRACTIONATION EMPLOYING
2-ETHOXY-6,9-DIAMINO-ACRIDINE-LACTATE
Elvin D. West, Prairieton, Ind., and Milton J. West, St. Anne, Ill., assignors to Pentex Incorporated, Kankakee, Ill., a corporation of Illinois
No Drawing. Continuation-in-part of application Ser. No. 282,207, May 22, 1963. This application Jan. 30, 1967, Ser. No. 612,326
13 Claims. (Cl. 260—112)

ABSTRACT OF THE DISCLOSURE

A method of fractionating animal blood serum in which the serum is cooled and the pH is adjusted to approximately 7.9. The beta and gamma globulins are precipitated with alcohol. The precipitates are dissolved in a a salt solution, and an acridine derivative precipitates all fractions in the salt solution except gamma globulin. The gamma globulin solution is cooled, and alcohol precipitates the gamma globulin to recover the gamma globulin. The precipitates with the beta globulin are dissolved in a second saline solution and the acridine derivative is removed. The beta globulin solution is cooled and alcohol precipitates the beta globulin to recover the beta globulin.

Cross-reference to related application

This application is a continuation-in-part of the inventors' co-pending application entitled, "Protein Fractionation," filed ay 22, 1963, and being Ser. No. 282,207.

Brief summary of the invention

This invention relates generally to a method of animal blood protetin fractionation and more particularly to a method for extracting gamma globulin from an animal blood serum, as well as extracting beta globulin from the same serum.

The particular object of this invention is to provide a method which produces a gamma globulin of a high degree of purity and also avoids denaturation and polymerization of the gamma globulin. In addition, beta globulin is also extracted from the same blood to increase the efficiency of the method.

In the instant invention, the blood serum is made from whole animal blood in any one of a variety of ways, all of which ways are well known. Starting with animal blood serum, the pH of the plood serum is adjusted to a point between 6.0 and 8.0 with a mineral or an organic acid or a mineral basic compound as may be required depending upon the pH of the serum. The adjustment of the pH at this point is particularly important since transferring is eliminated by this step. Hydrochloric acid is preferred as the acid and either sodium hydroxide or sodium hydrogen carbonate are the preferred basic compounds for adjustment of the pH.

After the pH of the serum has been adjusted to a proper level, the serum is cooled to a temperature of 0° centigrade or below and a quantity of alcohol is added. The cooling of the serum is important inasmuch as it prevents denaturation of the proteins by the alcohol. The quantity of alcohol is between 15% and 30% alcohol by volume, although 20% of isopropyl alcohol is preferred in this step. Any alcohol having 3 carbon atoms or less may be used. In the event acetone is used, a 25% volume is preferred. It should be noted that in this step, the alcohol is a 53% alcohol.

The addition of the alcohol to the serum forms a protein precipitate which consists of essentially; 10% alpha globulin, 50% beta glopulin, 30% gamma globulin, and 10% albumen. The alpha globulin and albumen are not normally precipitated by alcohol in the instant pH range; however, the alpha globulin and albumen are trapped by beta and gamma globulin particles and fall out as precipitate in this instance. The precipitate is then removed by means of a centrifuge, though it could be filtered out as well. The liquor is discarded, and each kilogram of precipitate is dissolved in 2 volumes of a 0.5% to 1.0% of an isotonic salt solution. Sodium chloride is the preferred salt in this instance. Potassium chloride is also acceptable and citrate and acetate salts may be used. The pH is again adjusted to a point between 7.0 and 8.0.

The next step is to precipitate all of the plood fractions except the gamma globulin. An acridine derivative is added which precipitates all the fractions except the gamma globulin. The precipitate is removed by means of a centrifuge, and activated charcoal is added to the remaining liquor containing the gamma globulin and acridine derivative, to remove the acridine derivative. The gamma globulin may then be removed by either of two methods.

The solution may be dried down as a gamma globulin salt solution, or the gamma globulin may be precipitated from the solution. In order to precipitate the gamma globulin, a 99% isopropyl alcohol is added to the liquor, which alcohol causes the gamma globulin to fall out. The precipitated gamma globulin is then removed by means of a centrifuge. It should be noted that the gamma globulin thus obtained has a high degree of purity.

Detailed description

A preferred method embodying the instant invention is one in which serum is prepared from animal blood in a well known manner. Normally, animal blood serum is at a pH of 7.6 to 7.8. The pH of the serum is adjusted to 6.9 to 7.1 with hydrochloric acid. In the above that the pH is lower than the required range, the pH is raised with either sodium hydroxide or sodium hydrogen carbonate. If the pH is higher than required, hydrochloric acid is used to bring the pH down to the proper level. After the pH is adjusted to the proper level, the serum is cooled to a temperature at 0° centigrade or below. Isopropyl alcohol is added to the cooled serum to a concentration between 25 and 30% and the temperature is lowered to avoid denaturation of the proteins. With the pH between 6.9 and 7.1, the addition of the alcohol causes the beta and gamma globulins to precipitate. A small amount of alpha globulin and a small amount of albumen is precipitated, but that is because it is trapped with the beta and gamma globulins as was mentioned above. With the addition of the isopropyl alcohol, the temperature of the liquor is lowered to a point between minus 3° and minus 5° centigrade. Lowering of the temperature increases the amount of protein which is precipitated. Furthermore, the lower temperature avoids denaturation of the protein.

With the beta and gamma globulin precipitated, these proteins are removed from the remainder of the liquor by centrifuging the liquor. It should be noted that the precipitated proteins may, also, be removed by filtration. After the beta and gamme precipitate is removed from the liquor, the precipitate is suspended in two volumes of a 0.8% saline solution. The pH of the solution is adjusted to a range between 7.4 and 8.0. In the event that the pH is above 8.0, hydrochloric acid is used to lower the pH; whereas if the pH is below 7.4, sodium hydroxide or sodium hydrogen carbonate is used to raise the pH. The temperature is maintained between 0° and minus 10° centigrade. It may be noted that the lower the temperature the less possibility there is for denaturation of the protein. After appropriate stirring, the beta and gamma globulins are in solution. Next, 2 volumes of 0.7% 2-ethoxy-6, 9-diamino-acridine-lactate are added to the solution. The addition of the 2-ethoxy-6, 9-diamino-acridinelactate precipitates the beta globulin as well as any other proteins which may have been precipitated out in the earlier precipitation. The precipitate is then removed either by centrifuging or by filtration. Thus, the gamma globulin is the only blood protein remaining in solution.

Some of the 2-ethoxy-6, 9-diamino-acridine-lactate remains with the gamma globulin in the effluent. This 2-ethoxy-6, 9-diamino-acridine-lactate is removed by adding a 1% to 2% volume of activated charcoal to the effluent to adsorb the 2-ethoxy-6, 9-diamino-acridine-lactate. The charcoal with the adsorbed 2-ethoxy-6, 9-diamino-acridine-lactate is removed by filtration, thus, leaving pure gamma globulin in the solution. Next, the solution is cooled and a 53% isopropyl alcohol is added to the solution to a concentration of 15 to 25%. The solution is cooled to a temperature between zero and minus 5° centigrade to prevent the protein from being denatured. The alcohol and chilling causes the gamma globulin to precipitate which gamma globulin is then removed by centrifugation or filtration. The precipitate which is the pure gamma globulin may then be suspended in water and dried. This method produces gamma globulin of a high degree of purity.

The beta globulin may, also, be recovered. The beta globulin which is in a form of a precipitate and has been separated from the gamma globulin may be purified. The beta globulin precipitate is dissolved in 2 to 3 volumes of a 0.8% to 1% saline solution, and a 3% to 5% volume of activated charcoal, based upon final liquid volume, is added to the solution to separate the 2-ethoxy-6, 9-diamino-acridine-lactate from the beta globulin. The pH of the beta globulin solution is adjusted to a point between 7.7 and 8.0. The solution is centrifuged to remove the charcoal which has adsorbed the 2-ethoxy-6, 9-diamino-acridine-lactate. The pH of the clear effluent is adjusted to 5.1 to 5.4 with hydrochloric acid and diluted to 8 volumes with water. The solution is chilled to 0° centigrade and 53% isopropyl alcohol is added to a 10 to 15% concentration. While the alcohol is being added, the temperature is maintained between 0° and minus 3° centigrade. The beta globulin, which is in the solution, is precipitated due to the addition of the alcohol and the cooling. The beta globulin precipitated out of the solution is removed by centrifugation. The beta globulin precipitate is then suspended into 2 volumes of a 0.8% saline solution and the pH of the solution is adjusted to 7.0 with either sodium hydroxide or sodium hydrogen carbonate. The solution is then dried by freeze drying. This method produces beta globulin of a 95% purity or better.

Although a specific process has been described above, variations may be made for specific types of blood. The general processes used in extracting beta and gamma globulin protein from various types of blood are set forth below.

Rabbit blood fractions

In the initial step of extracting gamma globulin from rabbit blood, serum is made from the rabbit blood by means of any of the well known methods. The pH of the serum is then adjusted to a point between 6.0 and 8.0. The serum is cooled to a temperature of 0° centigrade or below. Next, a 53% isopropyl alcohol is added to the cooled serum in a quantity between 20% and 30% by volume. The beta and gamma globulins as well as some of the alpha globulin and albumen then falls out as a precipitate by the action of the alcohol and cooling. The precipitate is then removed by means of a centrifuge.

Next, each kilogram of precipitate is suspended in 2 volumes of an 0.8% sodium chloride solution. The pH is then adjusted to a point between 7.5 and 8.0, so that the beta globulin and gamma globulin are in solution. After the beta globulin and the gamma globulin are in solution, 2.0 volumes of an 0.4% 2-ethoxy-6, 9-diamino-acridine-lactate solution are added to the liquor so that all of the blood fractions, including the alpha and beta globulin and the albumen, precipitate out except for the gamma globulin. The precipitate is then removed from the solution, and 1% to 2% activated charcoal is added to the solution to remove the 2-ethoxy-6, 9-diamino-acridine-lactate from the solution. The charcoal with the adsorbed 2-ethoxy-6, 9-diamino-acridine-lactate is removed, and the solution is cooled to approximately minus 5° centigrade. Then, a 99% solution of isopropyl alcohol is added in a volume equal to 20% to 25% which causes the gamma globulin to precipitate. The precipitated gamma globulin is removed by means of a centrifuge.

The beta globulin which was in the serum also may be recovered. The precipitate which was removed after the 2-ethoxy-6, 9-diamino-acridine-lactate was added is suspended in 2 to 3 volumes of an 0.8% sodium chloride solution. A 3.0% activated charcoal is added to solution and agitated until the suspension is complete. The pH is adjusted to a point between 5.1 and 7.0, thereby placing the beta globulin in solution. The activated charcoal is then centrifuged off to clear the solution and remove the 2-ethoxy-6, 9-diamino-acridine-lactate. A 99% isopropyl alcohol is added to a 20% volume thereby precipitating the beta globulin. The beta globulin then may be centrifuged off. The beta globulin extracted in this manner has a purity 90% or better.

Horse blood fractions

In order to extract the gamma globulin from horse blood, it is necessary to first make a horse serum. The horse blood serum is made in any one of the well known manners for making horse blood serum. The pH of a quantity of horse serum is then adjusted to a point between 6.0 and 8.0 if needed and cooled to a temperature of 0° centigrade or below. A 53% isopropyl alcohol is added in a volume between 20% and 30% to precipitate the blood fractions, beta globulin and gamma globulin and some of the alpha globulin and albumen. The precipitated blood fractions are then removed by means of a centrifuge.

The precipitated blood fractions are then treated to separate the gamma globulin from the remainder of the fractions. Each kilogram of precipitated blood fractions is suspended in 2 volumes of an 0.8% saline solution, and the pH is adjusted to a point between 7.0 and 8.0, so that the beta and gamma globulins go into solution. Next, 6.0 volumes of 0.4% 2-ethoxy-6, 9-diamino-acridine-lactate solution are added to the saline solution, thereby all of the blood fractions except the gamma globulin are precipitated. The precipitate is removed by a centrifuge and a liquor with the gamma globulin remains.

A 1% to 2% activated charcoal volume is added to the liquor. The activated charcoal adsorbs the 2-ethoxy-6, 9-diamino-acridine-lactate and the activated charcoal and 2-ethoxy-6, 9-diamino-acridine-lactate are removed by means of a centrifuge. The gamma globulin is then removed by adding 20% to 25% volume of 99% isopropyl alcohol. The addition of the alcohol plus cooling of the solution to minus 5° centigrade precipitates the gamma globulin. The gamma globulin is then removed by means of a centrifuge.

The beta globulin is also removed from the other precipitates in a manner similar to the way in which the beta globulin of the rabbit serum is removed. The precipitates, including the beta globulin, but excluding the gamma globulin which has been removed, are suspended in 2 to 3 volumes of an 0.8% solution of sodium chloride. A 3.0% activated charcoal volume is added to the solution, and the suspension is agitated until suspension is complete. The pH of the suspension is then adjusted to a point between 5.1 and 7.0 so that the beta globulin is completely in solution. The charcoal is centrifuged off to remove the 2-ethoxy-6, 9-diamino-acridine-lactate and other materials. A 99% isopropyl alcohol is added to the effluent in a 20% volume to precipitate the beta globulin. The beta globulin is removed by means of a centrifuge and this beta globulin has a purity in excess of 90%.

Canine blood fractions

Gamma globulin is extracted from canine blood in a manner similar to that described above. First of all, serum is extracted from a quantity of canine whole blood in a well known manner. The pH of the serum is then adjusted to a point between 6.0 and 8.0 if needed and the temperature is lowered to 0° centigrade or below by cooling. A 53% isopropyl alcohol is added to the serum in an amount between 20% and 30% volume, thereby precipitating the beta and gamma globulin as well as some of the alpha globulin and albumen which is in the serum.

The precipitate is then centrifuged off and each kilogram of precipitate is suspended in 2.0 volumes of an 0.8% sodium chloride solution. The pH is adjusted to a point between 7.5 and 8.0 so that the beta and gamma globulins are in solution. Next, 2 volumes of a 0.6% 2-ethoxy-6, 9-diamino-acridine-lactate solution are added to the solution, thereby precipitating all of the blood proteins except the gamma globulin. The precipitate is removed by means of a centrifuge, and then the solution with the gamma globulin is mixed with a 1% to 2% volume of activated charcoal. The 2-ethoxy-6, 9-diamino-acridine-lactate is removed by the activated charcoal, and the charcoal with the 2-ethoxy-6, 9-diamino-acridine-lactate is removed by a centrifuge.

The gamma globulin is removed by use of isopropyl alcohol. A 99% isopropyl alcohol in a volume between 20% and 25% is added to the solution while the solution is cooled to the point at 5 degrees below zero centigrade. Thus, the gamma globulin is precipitated. The gamma globulin then is removed by means of a centrifuge.

The beta globulin which was in the serum is then recovered. The precipitate including the alpha and beta globulin and albumen is suspended in 2 to 3 volumes of an 0.8% sodium chloride solution. A 3.0% volume of activated charcoal is added to the suspension to remove any 2-ethoxy-6, 9-diamino-acridine-lactate which may cling to the precipitates. The pH is then adjusted to a point between 5.1 and 7.0 to dissolve the beta globulin. The charcoal is centrifuged off, thereby removing the 2-ethoxy-6, 9-diamino-acridine-lactate from the suspension. The cleared solution is cooled to a temperature of 0° centigrade or below. Next, a 99% isopropyl alcohol is added to a 20% volume to precipitate the beta globulin. The beta globulin is centrifuged off. It has been found that this beta globulin has a purity in excess of 90%.

Bovine blood fractions

Bovine gamma globulin is extracted from bovine blood in a manner similar to the manner disclosed above for the other bloods. A quantity of bovine blood has the serum extracted in a well known manner. The serum is cooled to a temperature of 0° centigrade or below. Next, the bovine blood serum has its pH adjusted to a point between 6.0 and 8.0, if necessary. Then, the serum has a volume of 20% to 30% of 53% isopropyl alcohol added to it. Thus, the beta and gamma globulins are precipitated as well as some of the albumen and alpha globulin which are in the serum. The precipitate is centrifuged off, and it is further treated to separate the gamma globulin from the other blood proteins.

The further treatment of the precipitate includes suspending each kilogram of precipitate in 2 volumes of water. The pH is adjusted to a point between 7.6 and 7.8, so that the beta and gamma globulins are in solution. Two volumes of a 0.5% 2-ethoxy-6, 9-diamino-acridine-lactate solution are added to precipitate all of the blood fractions which are in solution except the gamma globulin. The precipitate is then centrifuged off leaving only the gamma globulin in solution. A 1% to 2% volume of activated charcoal is added to the solution in suspension. The charcoal is then removed and with it the 2-ethoxy-6, 9-diamino-acridine-lactate which is adsorbed by the charcoal.

The gamma globulin is then taken out of solution. The solution is cooled to a temperature of 5° below zero centigrade, and a 99% isopropyl alcohol is added to a 20% to 25% concentration. The gamma globulin precipitates out of the solution and the gamma globulin is then centrifuged off.

The beta globulin in the precipitate is also recovered. The precipitate containing alpha and beta globulin and albumen is then suspended in 2 to 3 volumes of an 0.8% solution of sodium chloride. A 3% volume of activated charcoal is added in suspension, and the suspension is agitated so all portions are in suspension. The pH is adjusted to a point between 5.1 and 7.0 so that the beta globulin goes into solution. The solution is centrifuged in order to remove all of the precipitate and charcoal which is in suspension, thereby leaving a solution of beta globulin.

The beta globulin is removed by adding a 99% isopropyl alcohol to a 20% volume. Thus, the beta globulin is precipitated and the beta globulin is removed by means of a centrifuge, which beta globulin has a purity in excess of 90%.

Human blood fractions

Human blood serum is first made from whole blood in any one of a number of well known manners. The pH of 18.2 liters of human blood serum is adjusted to 7.9, and the serum is cooled to a temperature of 0° centigrade or below. Next, a 53% isopropyl alcohol is added to a 20% volume, thereby forming a precipitate consisting essentially of; 10% alpha globulin, 50% beta globulin, 30% gamma globulin and 10% albumen. The precipitate is then removed by means of a centrifuge.

The precipitate is further refined in order to separate the gamma globulin from the other proteins. Each kilogram of precipitate is suspended in 2 volumes of an 0.8% sodium chloride solution. The pH of the liquor is adjusted to 7.7 so that the beta and gamma globulins are dissolved. Next, 6 volumes of an 0.4% solution of 2-ethoxy-6, 9-diamino-acridine-lactate is added which precipitates all of the blood proteins in solution with the exception of the gamma globulin. The precipitate is centrifuged out, and 1% to 2% volume of activated charcoal is added to the solution. After the charcoal is completely in suspension, the charcoal with the 2-ethoxy-6, 9-diamino-acridine-lactate, which is adsorbed by the charcoal, is removed by means of a centrifuge.

Next, the gamma globulin is precipitated off and removed from the solution. The solution is cooled to a temperature of 5° below zero centigrade. A 99% isopropyl alcohol is added in a 20% volume, thereby precipitating all of the gamma globulin in solution. The gamma globulin is then removed by means of a centrifuge.

The beta globulin is also fractionated by suspending each kilogram of precipitate without the gamma globulin in 2 to 3 volumes of an 0.8 to 1.0% sodium chloride solution. A 3.0% volume of activated charcoal is added to the suspension and the liquor is agitated until the charcoal is in suspension. The charcoal with adsorbed 2-ethoxy-6,9-diamino-acridine-lactate is centrifuged off to provide a clear solution. The pH of the clear solution is adjusted to a point between 5.1 and 5.4 with hydrochloric acid and is diluted to 8 volumes with water. The solution is cooled to a temperature of 0° centigrade or below. A 99% isopropyl alcohol is added to the liquor to a 20% volume, thereby precipitating the beta globulin and the temperature is maintained between 0° and minus 3° centigrade. The beta globulin is then centrifuged to remove the beta globulin. The beta globulin precipitate is suspended in two volumes of an 0.8% saline solution and the pH is adjusted to 7.6 with sodium hydroxide or sodium hydrogen carbonate to place the beta globulin into solution. The solution is dried by freeze drying to give a beta globulin having a purity of 95% or better.

Although specific bloods have been considered here, it is apparent that other bloods may be used by changing the specific conditions under which the present invention is to be used. Although specific examples have been set forth herein, it is to be understood that these examples are solely for the purpose of illustration and are in no wise intended to limit the present invention. It should be noted that blood plasma may also be used in the present method though for purposes of simplification serum has been specified throughout the foregoing specification with the understanding that in the present method plasma may be substituted for serum. It is therefore to be understood that the instant invention is limited only by the appended claims.

What is claimed is:

1. The method of extracting gamma globulin from an animal blood serum comprising the steps of: adjusting the pH of the serum to 7.9; cooling the serum to 0° centigrade or below; adding a 20% volume of 53% isopropyl alcohol to precipitate the beta and gamma globulin in the blood serum; removing the precipitate; suspending the precipitate in 2 volumes of 0.8% sodium chloride solution to dissolve the beta and gamma globulin; adding 6 volumes of a 0.4% 2-ethoxy-6, 9-diamino-acridine-lactate solution to precipitate all blood fractions except the gamma globulin; removing the precipitate; removing the 2-ethoxy-6, 9-diamino-acridine-lactate; adding isopropyl alcohol to precipitate the gamma globulin; and removing the gamma globulin.

2. The method of removing gamma globulin from animal blood serum comprising the steps of: adjusting the pH of the serum to a range between 6.0 and 8.0; cooling the serum to 0° centigrade or below; adding isopropyl alcohol in a volume equal to a range between 15% and 30% to precipitate the beta and gamma globulin in the blood serum; removing the precipitate; suspending the precipitate in 2 volumes of 0.5% to 1% sodium chloride solution to dissolve the beta and gamma globulin; adding 6 volumes of 0.4% 2-ethoxy-6, 9-diamino-acridine-lactate solution to precipitate all of the blood fractions except the gamma globulin; removing the precipitate; removing from the solution the 2-ethoxy-6, 9-diamino-acridine-lactate; cooling the gamma globulin solution; adding isopropyl alcohol to precipitate the gamma globulin; and removing the gamma globulin.

3. The method of extracting gamma globulin from animal blood serum comprising the steps of: adjusting the pH to a level between 6.0 and 8.0; cooling the serum to a temperature of 0° centigrade or below; adding a volume of alcohol between 15 and 30 percent to the serum which alcohol is selected from the group having 1, 2 or 3 carbon atoms to precipitate beta and gamma globulin from the serum; removing the precipitate; suspending the precipitate in two volumes of a 0.5% to 1% isotonic salt solution to dissolve the beta and gamma globulin; adding a sufficient quantity of 2-ethoxy-6, 9-diamino-acridine-lactate solution to precipitate all fractions of the serum except the gamma globulin; removing all of the precipitate; removing the 2-ethoxy-6, 9-diamino-acridine lactate; cooling the solution of gamma globulin to a temperature between minus 3° and minus 5° centigrade; adding an alcohol from the group of alcohols having 1, 2 or 3 carbon atoms to the gamma globulin solution to precipitate the gamma globulin; and removing the gamma globulin.

4. The method of extracting gamma globulin from an animal blood protein fraction comprising the steps of: adjusting the pH of the fraction to a level of between 6.0 and 8.0; cooling the fraction to a temperature of 0° centigrade or below; adding a volume of alcohol selected from the group having 1, 2 or 3 carbon atoms in a volume between 15% and 30% to precipitate the beta and gamma globulin in the fraction; removing the precipitate; suspending the precipitate in an isotonic salt solution having a chlorine ion and being of a range under a 1% solution to dissolve the beta and gamma globulin; adding 2-ethoxy-6, 9-diamino-acridine-lactate to precipitate all of the blood fractions except the gamma globulin; removing the precipitate; filtering out the 2-ethoxy-6, 9-diamino-acridine-lactate; precipitating the gamma globulin; and removing the gamma globulin.

5. The method of extracting gamma globulin from animal blood serum comprising: adjusting the level of the pH of the serum to a point between 6.0 and 8.0; cooling the serum to 0° centigrade or below; adding a volume of alcohol selected from the group having 1, 2 or 3 carbon atoms between 15% and 30% to form a precipitate consisting of beta globulin and gamma globulin; removing the precipitate; suspending the precipitate in a one-half percent solution of an isotonic salt which solution solubilizes the beta and gamma globulins; adding a sufficient quantity of 2-ethoxy-6, 9-diamino-acridine-lactate to precipitate all of the blood fractions except the gamma globulin; removing the precipitate; removing the 2-ethoxy-6, 9-diamino-acridine-lactate; cooling the gamma globulin solution; adding alcohol to the solution to precipitate the gamma globulin; and removing the gamma globulin.

6. The method of extracting gamma globulin from an animal blood serum comprising the steps of: adjusting the pH of the serum to a point between 6.0 and 8.0; cooling the serum to a temperature between 0° and minus 5° centigrade; adding a 53% isopropyl alcohol to the serum to a concentration between 20 and 30% to form a precipitate consisting essentially of beta globulin and gamma globulin; removing the precipitate; suspending each kilogram of precipitate in at least 2 volumes of 0.8% sodium chloride solution to dissolve the beta and gamma globulin; adding at least 2 volumes of 0.4% 2-ethoxy-6, 9-diamino-acridine-lactate solution to precipitate all of the blood fractions except the gamma globulin; removing all of the precipitate; adding activated charcoal to remove the 2-ethoxy-6, 9-diamino-acridine-lactate; cooling the solution of gamma globulin and adding a 99% isopropyl alcohol to a concentration between 20 and 25% to precipitate the gamma globulin; and removing the gamma globulin.

7. The method of extracting gamma globulin from an animal blood serum comprising: adjusting the pH of the serum to a point between 6.0 and 8.0; cooling the serum to a temperature of 0° centigrade and below; adding sufficient 53% isopropyl alcohol to form a concentration between 20 and 30% to form a precipitate consisting essentially of beta and gamma globulin; removing the precipitate; suspending each kilogram of precipitate in 2 volumes of 0.8% sodium chloride solution to dissolve the beta globulin and the gamma globulin; adjusting the pH to a point between 7.0 and 8.0; adding 6 volumes of 0.4% 2-ethoxy-6, 9-diamino-acridine-lactate solution to precipitate all remaining proteins of the serum except the gamma globulin; removing the precipitate; adding a 1 to 2% volume of activated charcoal to the sodium chloride solution to adsorb the 2-ethoxy-6, 9-diamino-acridine-lactate; removing the activated charcoal; cooling the sodium chloride solution; adding a 99% isopropyl alcohol to the sodium chloride solution to a concentration between 20 and 25% to precipitate the gamma globulin; and removing the gamma globulin.

8. The method of extracting gamma globulin from an animal blood serum comprising the steps of: adjusting the pH of the serum to a point between 6.0 and 8.0; cooling the serum to 0° centigrade or below; adding 53% isopropyl alcohol to a concentration between 20 and 30% to form a precipitate including beta and gamma globulin; removing the precipitate; suspending each kilogram of precipitate in 2 volumes of 0.8% sodium chloride solution to solubilize the beta and gamma globulin; adjusting the pH to a point between 7.5 and 8.0; adding two volumes of 0.6% 2-ethoxy-6, 9-diamino-acridinelactate solution to precipitate all of the remaining protein fractions of the blood serum except the gamma globulin; removing the precipitate from the solution; removing the 2-ethoxy-6, 9-diamino-acridine-lactate with activated charcoal; cooling the sodium chloride solution to at least minus 3° centigrade; adding 99% isopropyl alcohol to a concentration between 20 and 25% to precipitate the gamma globulin; and removing the gamma globulin.

9. The method of extracting gamma globulin from an animal blood serum comprising the steps of: adjusting the pH of the serum to a point between 6.9 and 7.1; cooling the serum to a temperature between 0° and minus 5° centigrade; adding isopropyl alcohol in sufficient quantity to make a 20 to 30% concentration to form a precipitate including beta globulin and gamma globulin; removing the precipitate; adding the precipitate in 2 volumes of water and adjusting the pH to a point between 7.6 and 7.8 to dissolve the precipitate; adding 2 volumes of 0.5% 2-ethoxy-6, 9-diamino-acridine-lactate solution to precipitate all remaining fractions of the serum in solution except the gamma globulin; removing the precipitate, adding a 1 to 2% activated charcoal to remove the 2-ethoxy-6, 9-diamino-acridine-lactate; cooling the gamma globulin solution; adding isopropyl alcohol to a concentration between 20 and 25% to precipitate the gamma globulin; and removing the gamma globulin.

10. The method of extracting protein from an animal blood serum comprising the steps of: adjusting the pH to a point between 6.9 and 7.1; cooling the serum to a temperature between minus 0° and minus 5° centigrade; adding isopropyl alcohol to a concentration between 25 and 30% to cause a precipitate of beta and gamma globulin to form; removing the precipitate; dissolving the precipitate to 2 volumes of a saline solution and maintaining the temperature of the saline solution between 0° and minus 10° centigrade; adding 2 volumes of 2-ethoxy-6, 9-diamino-acridine-lactate to the saline solution to precipitate the beta globulin; removing the beta globulin precipitate from the gamma globulin-saline solution; adding at least 1% activated charcoal to the gamma globulin-saline solution to adsorb the 2-ethoxy-6, 9-diamino-acridine-lactate; cooling the gamma globulin-saline solution to a temperature between 0° and minus 5° centigrade; adding alcohol to the gamma globulin-saline solution to a concentration between 15 and 25% to precipitate the gamma globulin; removing the gamma globulin precipitate; dissolving the beta globulin precipitate in at least 2 volumes of an 0.8% saline solution; adding at least 3% activated charcoal to the beta globulin-saline solution; adjusting the pH of the beta globulin-saline solution to a point between 7.7 and 8.0; removing the charcoal to remove with it 2-ethoxy-6, 9-diamino-acridine-lactate adsorbed by the charcoal; adding hydrochloric acid to the beta globulin-saline solution to adjust the pH to a point between 5.1 and 5.4; diluting the beta globulin-saline solution to 8 volumes with water; cooling the beta globulin-saline solution to a temperature between 0° and minus 3° centigrade; adding isopropyl alcohol to the beta globulin-saline solution to a concentration between 10 and 15% to precipitate the beta globulin; and removing the beta globulin precipitate.

11. The method of extracting proteins from an animal blood serum comprising the steps of: adjusting the pH of the serum to a level between 6.0 and 8.0; cooling the serum to a temperature [less than 1°] of 0° centigrade or below; adding to the serum a volume of alcohol selected from the group having 1, 2 or 3 carbon atoms in a volume between 15% and 30% to precipitate the beta and gamma globulins in the serum; removing the precipitated beta and gamma globulins; dissolving the beta and gamma globulins precipitate in an isotonic salt solution; adding to the isotonic salt solution 2-ethoxy-6, 9-diamino-acridine-lactate to precipitate all of the blood protein fractions except the gamma globulin; removing the precipitate of all of the blood fractions and leaving a solution containing gamma globulin; removing the 2-ethoxy-6, 9-diamino-acridine-lactate from the gamma globulin solution; precipitating the gamma globulin and removing the precipitated gamma globulin; dissolving the precipitate of all of the blood fractions in at least 2 volumes of an 0.8% saline solution; removing the 2-ethoxy-6, 9-diamino-acridine-lactate from the solution of the blood fractions; adding hydrochloric acid to the solution of the blood fractions to adjust the pH to a point between 5.1 and 5.4; diluting the solution of the blood fractions with water to a quantity of 8 volumes; cooling the solution of the blood fractions to a temperature between 0° and minus 3° centigrade; adding isopropyl alcohol to a concentration between 10 and 15% to precipitate the beta globulin; and removing the beta globulin precipitate.

12. The method of extracting proteins from animal blood serum comprising the steps of: adjusting the pH of the serum to a level between 6.0 and 8.0; cooling the serum to a temperature of 0° centigrade and below; adding alcohol selected from a group having 1, 2 or 3 carbon aotms to the serum in a volume between 15% and 30% to precipitate beta and gamma globulins in the serum; removing the precipitated beta and gamma globulins; dissolving the beta and gamma globulins precipitate in an isotonic salt solution; adding 2-ethoxy-6, 9-diamino-acridine-lactate to the isotonic salt solution to precipitate all of the blood fractions except the gamma globulin; removing all of the precipitate from the salt solution and leaving the gamma globulin in solution; removing the 2-ethoxy-6, 9-diamino-acridine-lactate from the salt solution; precipitating the gamma globulin and removing the gamma globulin; dissolving the precipitate of all of the blood fractions which was removed from the salt solution in a second saline solution; removing the 2-ethoxy-6, 9-diamino-acridine-lactate from the second saline solution; cooling the second solution to a temperature of 0° centigrade or below; adding alcohol to the second saline solution to precipitate the beta globulin; and removing the beta globulin precipitate.

13. The method of extracting proteins from animal blood serum comprising the steps of: adjusting the pH of the serum to a level between 6.9 and 7.1; cooling the blood serum to a temperature between minus 0° and minus 5° centigrade; adding 53% isopropyl alcohol to the serum to a concentration between 25 and 30% to cause beta and gamma globulin to precipitate from the serum; removing the precipitate; adding the precipitate to 2 volumes of an 0.8% saline solution to dissolve the precipitate therein; maintaining the temperature of the solution between 0° and minus 10° centigrade; adding 2 volumes of 2% 2-ethoxy-6, 9-diamino-acridine-lactate to the saline solution to precipitate all of the blood fractions except the gamma globulin; removing all of the precipitate from the gamma globulin-saline solution; adding at least 1% by volume of activated charcoal to the gamma globulin-saline solution to adsorb the 2-ethoxy-6, 9-diamino-acridine-lactate; removing the activated charcoal with the adsorbed 2-ethoxy-6, 9-diamino-acridine-lactate; cooling the gamma globulin-saline solution to a temperature between 0° and minus 5° centigrade; adding 53% isopropyl alcohol to the gamma globulin-saline solution to a concentration between 15 and 25% to precipitate the gamma globulin; removing the gamma globulin precipitate; dissolving the beta globulin precipitate in 2 to 3 volumes of an 0.8 to 1% sodium chloride solution; adjusting the pH of the sodium chloride solution to a point between 7.7 and 8.0; adding a 3 to 5% volume of activated charcoal to adsorb the 2-ethoxy-6, 9-diamino-acridine-lactate in the beta globulin-sodium chloride solution; removing the activated charcoal with the adsorbed 2-ethoxy-6, 9-diamino-acridine-lactate; adding water to the beta globulin-sodium chloride solution to increase the solution to 8 volumes; adding hydrochloric acid to the beta globulin-sodium chloride solution to adjust the pH to a level between 5.1 and 5.4; cooling the beta globulin-sodium chloride solution to a temperature of 0° and below; adding to the beta globulin-sodium chloride solution isopropyl alcohol to a concentration between 10 and 15% to precipitate the beta globulin; maintaining the temperature of the sodium chloride solution between 0° and minus 3° centigrade; removing the beta globulin precipitated by the alcohol; dissolving the beta globulin precipitate in 2 volumes of an 0.8% saline solution; adding a basic compound selected from the group of sodium hydroxide or sodium hydrogen carbonate to the beta globulin-saline solution to adjust the pH to a level of 7.6; freezing the beta globulin-saline solution; and drying the solution to recover the beta globulin.

References Cited

Chem. Abstracts, vol. 48, 1954, 13781c–d Horejsi.
Chem. Abstracts, vol. 49, 1955, 5567a–b Horejsi.
Chem. Abstracts, vol. 50, 1956, 15616b–c Horsjsi.
Chem. Abstracts, vol. 51, 1957, 6741c–d Horejsi.
Chem. Abstracts, vol. 54, 1960, 2470i, 2471a Saifer.
Chem. Abstracts, vol. 55, 1961, 21485d–f Gubenko.
Chem. Abstracts, vol. 56, 1962, 15793e–h Stastny.
Kabat and Mayer, Experimental Immunachemistry, 2nd ed., 1961, pp. 763–765 and 768–773.

WILLIAM H. SHORT, *Primary Examiner.*

H. S. CHAIN, *Assistant Examiner.*